Oct. 3, 1967             TOSHIO SATO            3,345,543
SOLID ELECTROLYTIC CAPACITOR WITH ANODIZED ALUMINUM
ELECTRODE AND METHOD OF MAKING
Filed March 11, 1965

Toshio Sato
INVENTOR

BY Wenderoth, Lind and Ponack ATTORNEYS 3,345,543
SOLID ELECTROLYTIC CAPACITOR WITH ANODIZED ALUMINUM ELECTRODE AND METHOD OF MAKING
Toshio Sato, 897 Chigase Oome-shi, Tokyo-to, Japan
Filed Mar. 11, 1965, Ser. No. 438,983
3 Claims. (Cl. 317—230)

ABSTRACT OF THE DISCLOSURE

The invention resides in a capacitor with an anodized aluminum anode and manganese dioxide electrolyte produced from manganese hydrate and nitrate, both applied over the dielectric film and in situ converted to the dioxide.

---

The present invention relates to an electrolytic capacitor in which the anode is solid aluminum and to a method of making such a capacitor.

Heretofore, capacitors having anodes of solid aluminum have been manufactured in the same manner as capacitors having tantalum anodes. However, when the aluminum anodes were dipped into strong acid during the manufacturing process, the relatively weak aluminum oxide film was damaged or destroyed, and the use of the method of making a tantalum-type anode has therefore not been practical with aluminum.

It is an object of the present invention to provide a method of utilizing aluminum for a capacitor anode which is practical, and in which the anode and a cathode layer thereon is properly formed during the method.

It is a further object of the present invention to provide a method of utilizing aluminum for a capacitor anode which produces a capacitor which is not inferior to a capacitor which has a solid tantalum anode, yet which is faster than the method used with tantalum, which produces capacitors at about one third the cost as compared with the use of tantalum, and which can be carried out continuously to mass produce capacitors.

The method comprises electrolytically forming an oxide film on the aluminum anode, dipping the thus oxide coated aluminum anode in manganese carbonate or otherwise impregnating the anode with manganese carbonate, dipping the impregnated anode in an aqueous manganous nitrate solution, and then thermally decomposing the coatings to produce manganese dioxide. Thereafter, a cathode layer is placed over the manganese dioxide layer, and the capacitor is completed in the conventional manner with a coating and leads for the anode and cathode.

The invention will be made clearer by the following specification and claims, taken together with the accompanying drawings, in which:

Applicant has found, as a result of experiments to find a method to overcome the deficiencies of using the method commonly employed with tantalum anode type capacitors on aluminum anode type capacitors, that by using manganese carbonate as a basic hydrate, the action of the nitric acid formed by the hydrolysis of the manganous nitrate in the aqueous solution into which the anode is dipped can be neutralized.

The action of the nitric acid on the aluminum anode is according to the following reaction equation:

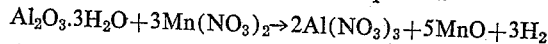

However, when manganous carbonate is present in the aluminum oxide film on the aluminum anode, manganese dioxide forms before the aluminum oxide film is attacked, as indicated by the following equation:

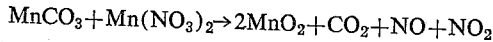

Consequently, the oxide film on the aluminum anode is not damaged. Moreover, if the manganese carbonate is a fine powder, it is changed into manganese dioxide without its solid form being changed, and it acts as a support for the formation of manganese dioxide crystals during thermal decomposition of manganous nitrate, so that a uniform thin semiconductor cathode is formed on the surface of the aluminum oxide film.

Accordingly, the method of the present invention comprises the steps of first etching the aluminum anode to provide a clean aluminum surface, and then electrolytically forming an oxide film on the aluminum. Thereafter, the oxide coated aluminum is impregnated with basic manganese carbonate hydrate, for example by dipping it into the material, and thereafter it is dried. The thus impregnated aluminum is then dipped into an aqueous solution of manganese nitrate, after which it is heated in an oxidizing atmosphere at a temperature of from 300–400° C. for a time of from 4 to 6 minutes. By this heating, the manganese carbonate reacts with the nitric acid before the manganese nitrate reaches the decomposition temperature, the alkali radical of the manganese carbonate neutralizing the nitric acid so as to protect the aluminum from attack.

Figure 1:
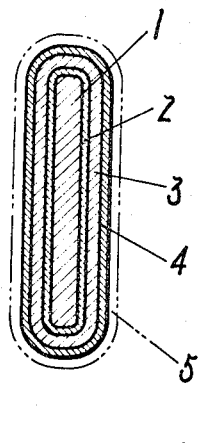
FIG. 1 is a sectional view through an aluminum anode type capacitor according to the present invention.
Figure 2:
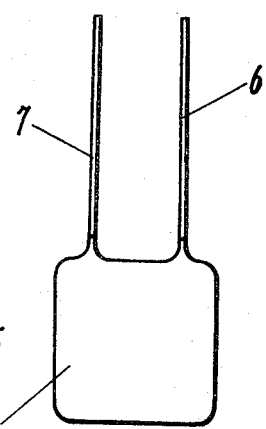
FIG. 2 is an elevation view of a capacitor according to the present invention.

As seen in FIG. 1, the capacitor which is produced by this method has a solid aluminum anode member 1 with an electrolytically formed layer 2 of aluminum oxide thereon. Over the aluminum oxide layer 2 is a layer of manganese oxide 3 and around this layer is the cathode member 4. An insulating covering 5 is also provided, and can be of any appropriate material common in the art. As seen in FIG. 2, there are two leads from the capacitor, the anode lead 6 which extends from the anode member 1, and the cathode lead 7 which extends from the cathode member 4. The capacitor of FIG. 2 is the flat type of capacitor.

Figure 3:
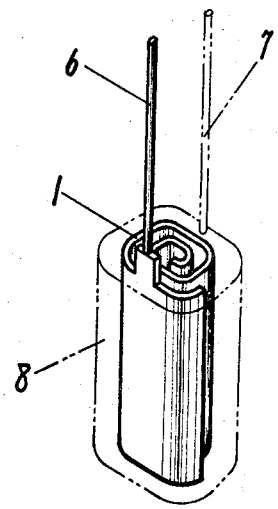
FIG. 3 is a perspective view of a spirally wound anode for a capacitor according to the present invention, a cathode layer being shown in dotted outline.

As seen in FIG. 3, the capacitor made according to the method of the present invention can be formed into a spiral type capacitor. The anode member 1 with the aluminum oxide layer thereon and the manganese oxide layer over the aluminum oxide layer is spirally coiled, the anode member 1 being provided with the anode lead 6. A cathode material 8 is placed around the thus spirally wound anode member 1, and a cathode lead 7 is provided thereon. The capacitor is then covered with a suitable insulation material (not shown).

The cathode members 4 and 8 are made in the same manner as corresponding cathode members are made for tantalum type capacitors. For example, the cathode members can be an impregnated colloidal graphite layer with a metal coating thereon of a conductive silver paint.

Figure 4:
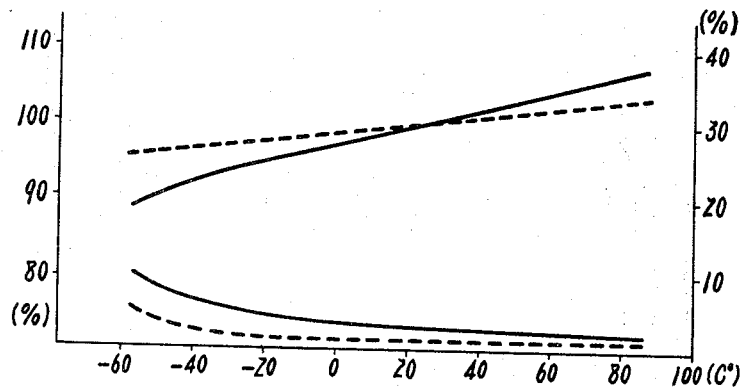
FIG. 4 is a graph showing the operating characteristics of the capacitor according to the present invention as compared to a tantalum anode type capacitor.

The graph of FIG. 4 shows that the electrostatic capacity and loss characteristics of the aluminum anode capacitor according to the present invention are not inferior to the same characteristics of a tantalum anode capacitor produced according to the prior art method. The graph shows the result of tests conducted at a frequency of 120 cycles/sec., the left hand vertical scale being the rate of change in electrostatic capacity in percent, the right hand vertical scale being the loss in percent, and the horizontal scale being the temperature in ° C. The solid curves are the values for the aluminum anode capacitor according to the present invention, and the dotted line curves are the values for the tantalum anode capacitor of the prior art. The curves show that the aluminum anode capacitor according to the present invention has a characteristic curve for rate of change in electrostatic capacity with change in temperature which substantially parallels the curve for a tantalum anode capacitor, being only slightly higher, and that the characteristic curve for loss with change in temperature is slightly steeper than the corresponding curve for the tantalum anode, crossing the tatalum anode curve about midway in the temperature range tested.

The method according to the present invention and the capacitor made by the method is therefore not inferior to the prior art tantalum capacitor, and the method is also very practical. The method is efficient, no special or difficult steps requiring hand labor are necessary, it being possible to mass produce capacitors by following the method. The method is also very efficient, it being possible to reduce the time needed to make the capacitors to half that necessary for the tantalum anode electrodes, and the price of the capacitor can be reduced to about one third that of a corresponding tantalum anode capacitor. The method can be used to make flat type capacitors or spiral type capacitors, and consequently can be used to make very small devices.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

What is claimed is:

1. A method of making a capacitor, comprising the steps of etching an aluminum anode member to clean the surface thereof, electrolytically forming an oxide film on the surface of the aluminum anode member, impregnating the oxide coated aluminum with basic manganese carbonate hydrate, drying the impregnated anode member, dipping the impregnated anode into an aqueous solution of manganous nitrate, and thereafter heating the dipped anode in an oxidizing atmosphere at a temperature of from 300–400° C. for forming a reducible manganese dioxide electrolyte layer over the aluminum oxide layer, and then placing a cathode member in intimate contact over the manganese dioxide layer.

2. A method of making a capacitor as claimed in claim 1 in which the step of impregnating the oxide coated aluminum comprises dipping the aluminum into powdered manganese carbonate hydrate.

3. A solid electrolytic capacitor comprising an aluminum anode, a dielectric oxide film anodized on the surface of said anode, a solid reducible manganese dioxide electrolyte layer intimately overlying said dielectric film, said electrolyte layer being the in situ pyrolytic conversion product of a manganous salt layer including a coating of manganese carbonate hydrate on the dielectric oxide film together with a coating of manganese nitrate on the carbonate hydrate and both coatings being simultaneously in situ pyrolytically converted into said reducible manganese dioxide electrolyte layer, and a conductive cathode disposed in intimate contact on said solid electrolyte layer.

References Cited

UNITED STATES PATENTS 2,936,514   5/1960   Millard.
3,054,029   9/1962   Wagner et al.
3,100,329   8/1963   Sherman.

JAMES D. KALLAM, *Primary Examiner.*